United States Patent [19]
Nagashima

[11] Patent Number: 5,145,233
[45] Date of Patent: Sep. 8, 1992

[54] ARRANGEMENT OF HEADREST IN SEAT

[75] Inventor: Hideo Nagashima, Akishima, Japan

[73] Assignee: Tachi S Co., Ltd., Japan

[21] Appl. No.: 780,368

[22] Filed: Oct. 22, 1991

[51] Int. Cl.5 ............................................. A47C 7/36
[52] U.S. Cl. .................................... 297/408; 297/403
[58] Field of Search ............... 297/403, 408, 396, 391

[56] References Cited
U.S. PATENT DOCUMENTS

| 5,011,225 | 4/1991 | Nemoto | 297/408 |
| 5,011,226 | 4/1991 | Ikeda et al. | 297/408 |

FOREIGN PATENT DOCUMENTS

| 305095 | 12/1988 | Japan | 297/408 |
| 699899 | 11/1953 | United Kingdom | 297/403 |

Primary Examiner—Laurie K. Cranmer
Attorney, Agent, or Firm—Oldham, Oldham & Wilson Co.

[57] ABSTRACT

An arrangement of a headrest in a seat wherein the headrest is displaceable rotatively about a shaft between a vertical use and horizontal non-use positions, and a drive mechanism is disposed at one end side of the shaft while a stopper is fixed on another end of same shaft, and wherein an elastic means is disposed at a point wherein such stopper is to be brought to contact with the elastic means.

4 Claims, 4 Drawing Sheets

ARRANGEMENT OF HEADREST IN SEAT

BACKGROUND OF THE INVENTION

1. Field of the Invention

The present invention relates to a headret provided in an automotive seat, and in particular to an arrangement of a movable headrest in the seat, the headrest being of the type displaceable from an upright use position on the seat down to a non-use position below a vision field of an occupant on another seat, so that forward view or backward view can be attained widely from a person on a rear seat or a driver on a front seat, respectively.

2. Description of Prior Art

There has been known a movable headrest of this type displaceable between its erecting use position and lowered non-use position, by which an occupant's head may be normally supported at the use position and otherwise the headrest per se may be moved down to the non-use position for avoiding hindrance to a vision field of another occupant on another seat.

Such headrest, conventionally, has been coupled to a drive mechanism via a one link within a seat, which is typically known from U.S. patent application No. 686,189 assigned to the same assignee of the present invention. According thereto, a pair of stays of headrest are secured on a rotatable shaft disposed within a seat back, and a connecting rod is at its one end connected pivotally to a link piece extending orthogonally from the rotatable shaft. Another end of the connecting rod is formed with a rack gear part which is in mesh with a pinion of a drive mechanism including a motor. Actuating the motor causes the connecting rod to move vertically through the pinion-and-rack gear transmission, which in turn causes the link piece to rotate simultaneously likewse about the axis of the rotatable shaft. Then the shaft is rotated to displace the headrest between the use and non-use positions. This permits for controlling the motion of headrest and adjusting its deisred positions between the use and non-use positions.

In this sort of headrest construction, as can be seen from the U.S. patent application No. 686,189, typically, the drive mechanism and connecting rod are disposed adjacent to one of both lateral sides of seat back, and as such, no control mechanism is provided at another opposite side of seat back, which means that the control drive force is only imparted to one lateral side of the rotatable shaft connected to the hearest body. Such one-side control or what can be described as cantilever-like transmission has been found defective in that (i) a sudden great load applied to the headrest in a collision case is too intesively exerted on a free side of rotatable shaft which is relatively weak as opposed to the foregoing control side of same shaft to which the connecting rod is connected, thus raising a high likelihood of the shaft being twisted and deformed, in which case, the headrest is also twisted, impairing the appearance of seat, and (ii) a slightly loosen engagement between the pinion and rack gears, which is needed in design for absorbing a variation in angle of mesh between them during vertical translation of the connecting rod, will easily tend to create a slight wobbling in the two gears and such wobbling will be transmitted, when the headrest is at the non-use position, to the headrest body, with an amplified magnitude, through the connecting rod, link piece and shaft which form a leverage serving to transform the slight wobbling into a corresponding larger rotative motions of the stays relative to the shaft forming a fulcrum, thus wobbling the headrest with an unpleasant contact noise, which may give an unstable psychological state to an occupant on the seat, dispersing his or her concentration for driving the car.

SUMMARY OF THE INVENTION

In view of the above-stated drawbacks, it is therefore a first purpose of the present invention to provide an improved arrangement of a headrest in a seat which prevents a wobbling of a headrest in its non-use position.

In order to achieve this purpose, in accordance with the invention, in such headrest construction wherein a drive mechanism is disposed only at one side of a seat back frame, the arrangement is characterized in comprising: a crank-like shaft rotatably supported at the upper part of the seat back frame, a stopper means provided fixedly at another free end part of the shaft which is disposed at another side of seat back frame where such drive mechanism is not present, a bearing bracket fixed on such another side of seat back frame, on which bearing bracket is rotatably supported foregoing another free end part of shaft, and an elastic means provided fixedly in the bearing bracket such as to resiliently receive one side surface of the stopper means when the headrest is located at the non-use position, wherein the headrest at the non-use position is supported stably by virtue of the drive mechanism at one side of seat back frame and both stopper and elastic means at another side thereof.

Accordingly, the headrest is supported in a bilateral manner instead of prior art cantilever-like one side support structure, thereby providing a robust headrest arrangement, and since the stopper means is contacted with the elastic means in a resilient way, it is possible to suppress the unpleasant noise and further to absorb a wobbling in the constituent elements of the drive mechanism (e.g. rack and gear mechanism).

It is a second purpose of the invention to prevent the headrest and shaft against twisting deformation.

To this end, in addition to the above-stated arrangement, the drive mechanis includes a link member fixed to the foregoing one end part of shaft and another bearing bracket fixed on the foregoing one lateral side of seat back frame, such that the link member is to be contacted with another elastic means provided in such another bearing bracket.

DETAILED DESCRIPTION OF PREFERRED EMBODIMENT OF THE INVENTION

Figure 1:
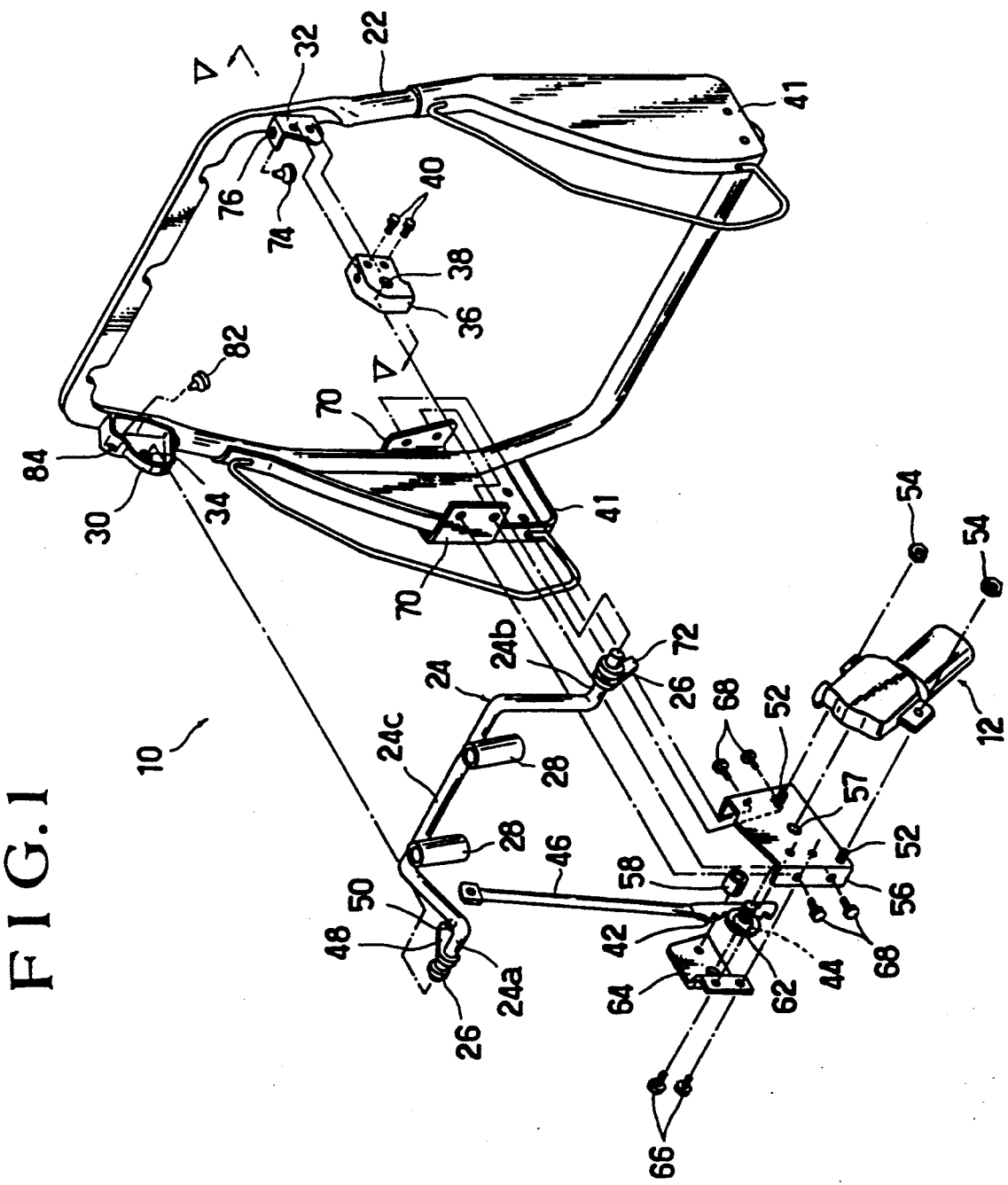
FIG. 1 is an exploded perspective view of a headrest arrangement in accordance with the present invention.
Figure 2:
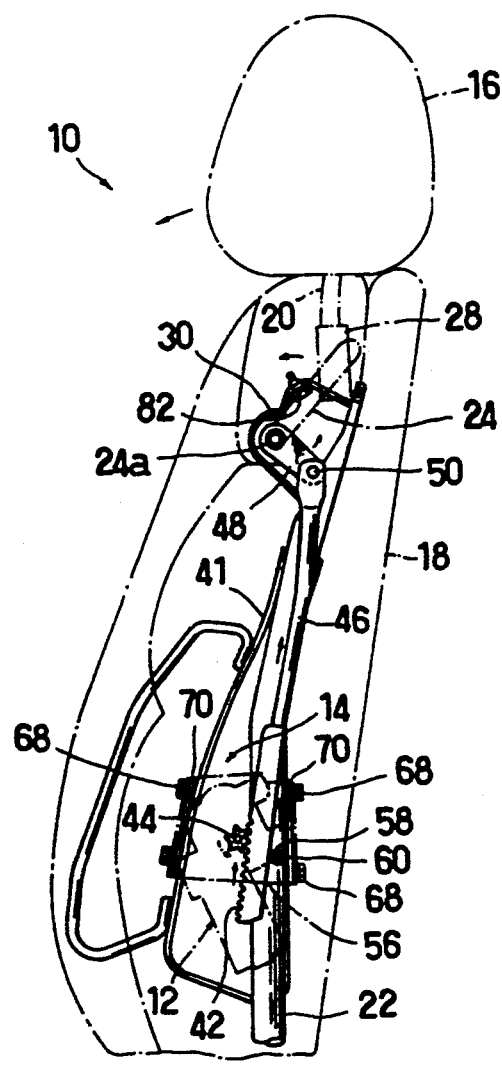
FIG. 2 is a schematic, longitudinally sectional view of the headrest arrangement, with the headrest being located at the use position.

FIGS. 1 and 2 generally show an arrangement of headrest in seat according to the present invention, by designation (10), which includes a drive mechanism (14) having a motor incorporated therein, whereby a headrest (16) may be moved forwardly and backwardly by actuation of the drive mechanism (14) relative to a seat back (18).

Figure 3:
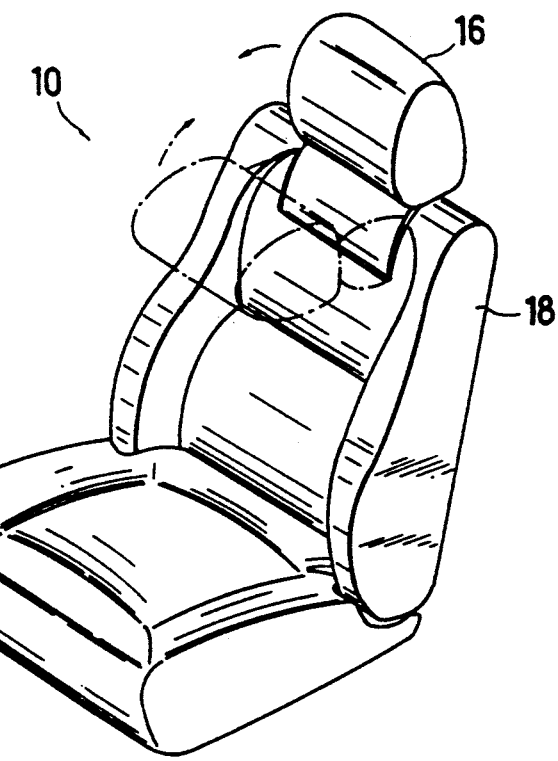
FIG. 3 is a schematic perspective view of a seat to which is applied the headrest arrangement.

As seen in FIGS. 2 and 3, the headrest (16) is movably mounted on the top of seat back (18) such as to be displaceable between a use position for supporting a head of occupant sitting on the seat, as indicated by the solid line in FIG. 3, and a non-use position as indicated by one-dot chain line in the figure.

The headrest 16, as in FIG. 2, is coupled via a pair of stays (20) fast to a shaft (24) disposed at the upper frame section of seat back frame (22).

Viewing now FIG. 1, the shaft (24) is formed by bending a straight tube material into a crank shape, having ends (24a)(24b) defined in a coaxial relation with each other. A pair of spaced-apart of stay holders (28) are welded to the crank section (24c) of shaft (24), and a stopper ring (26) is provided at each of those ends (24a)(24b). FIG. 2 shows the headrest stays (20) as having been inserted in the respective stay holders (28), thus indicating the state of the headrest (16) being mounted upon the shaft (24).

As viewed particularly from FIG. 1, fixed integrally to the upper part of left-side frame section of seat back frame (22), is a first bearing bracket (30), whereas fixed likwise to the upper part of right-side section of same frame (22), is a mounting bracket (32). In this respect, as understandable from FIG. 1, firstly the end (24a) of shaft (24) is inserted through the hole (34) of first bearing bracket (30) and then, the other end (24b) of same shaft is inserted through the hole (38) of bearing member (36). Thereafter, the bearing memeber (36) is fastened to the mounting bracket (32) by means of securing screws (40). By being such constructed, the shaft (24) is free to rotate about an axis extending through the two ends (24a)(24b), so that rotation of shaft (24) will cause fore-and-aft rotative movement of headrest (16) via the crank section (24c) of shaft (24) in relation to the seat back (20).

Designations (41) denote side bracket mounted on the respective lateral sections of seat back frame (22).

The drive mechanism (14), as can be seen from FIGS. 1 and 2, i basically comprised of the motor (12) of DC geared type, a pinion gear (44) connected to the motor (12) and a connecting rod (46) having a rack gear part (42) formed at the lower portion thereof, wherein the pinion gear (44) is in mesh with the rack gear part (42). Specifically, the motor (12) is mounted fast on the motor bracket (56) by way of fastening nuts (54) to screws (52) projected from the motor bracket (56). The pinion gear (44) is connected through a hole (57) of motor bracket (56) to an output shaft (not shown) of the motor (12). An elastic member (58) made of an urethane rubber or the like is provided on a pin (60) of motor bracket (56) so as to resiliently support the straight rear edge of lower rack part (42) of the connecting rod (46) (See FIG. 2). A rack guide bracket (64) is fixed by screws (66) to the motor bracket (56), thereby housing and supporting the pinion and rack gears (44) (42) therein. Thus-assembled motor bracket (56) is fixed to a support bracket (70) by means of screws (68), which support bracket (70) is fixed to the lower part of left-side section of seat back frame (22).

As shown, a link piece (48) is fixed integrally to the left-side end (24a) of shaft (24), projecting therefrom in a direction orthogonal to the axis of that end (24a). To the free end of such link piece (43), the upper end of connecting rod (46) is connected pivotally by means of a pin (50).

Figure 5:
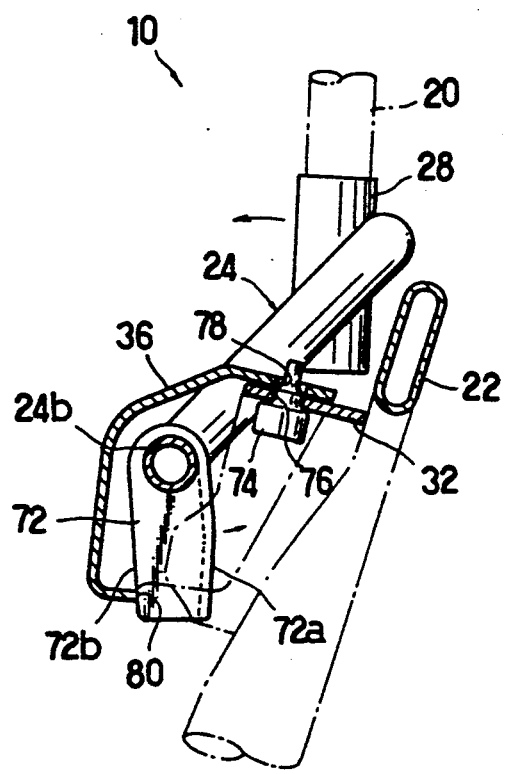
FIG. 5 is a sectional view taken along the line V—V in FIG. 1.

Now, reference is made to FIGS. 1 and 5. In accordance with the present invention, there is provided a stopper member (72) on the left-side end (24b) of shaft (24) where no such drive mechanism (14) is arranged. As best shown in FIG. 5, the stopper member (72) is fixed at its base end part to the end (24b) of shaft (24), extending therefrom in a direction orthogonal to the axis thereof. The forward extending body of stopper member (72) is formed at its both lateral sides with first and second contact edges (72a)(72b).

The second bearing bracket (36) has, formed at its lower side, a detent edge (80) for limiting the downward rotation of the foregoing stopper member (72): Namely, the second contact edge (72b) of stopper member (72) comes to contact with such detent edge (80) when the headrest (16) reaches at the given use position, whereupon the headrest (16) is located and retained at the use position against further backward movement. As best seen from FIG. 1, the upper surface of second bearing bracket (36) is formed with a through-hole (78) for a purpose to be stated below.

Figure 6:
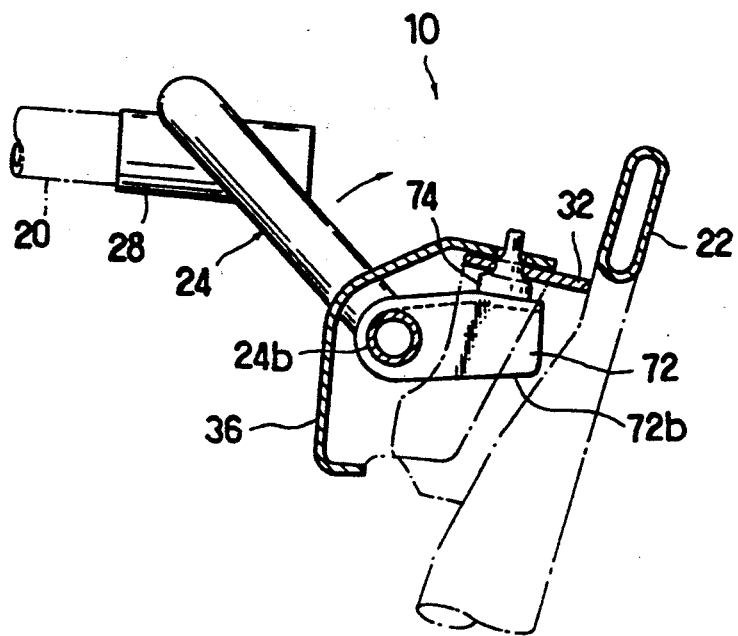
FIG. 6 is a sectional view similar to that in FIG. 5, which indicates the headrest to be located at the non-use position.

Similar to the hole (78) of bracket (36), the upper part of the mounting bracket (32) is formed with a through-hole (76) whose diameter is identical to that of hole (78). Those two holes (76)(78) are aligned with each other when the bearing bracket (36) is secured to the mounting bracket (32), so that an elastic member (74) is fit inserted through the two juxtaposed holes (76)(78) and fixed there. Like the detent edge (80) of bearing bracket (36), the elastic member (74) is so adapted that the other first contact edge (72a) of stopper member (72) is brought to contact with the elastic member (74) when the headest (16) reaches the non-use position as shown in FIG. 6. Hence, the headrest (16) is limited its downward movement by the elastic member (74) and stopped at the non-use position. The elastic member is made of an urethane rubber material or the like.

Figure 4:
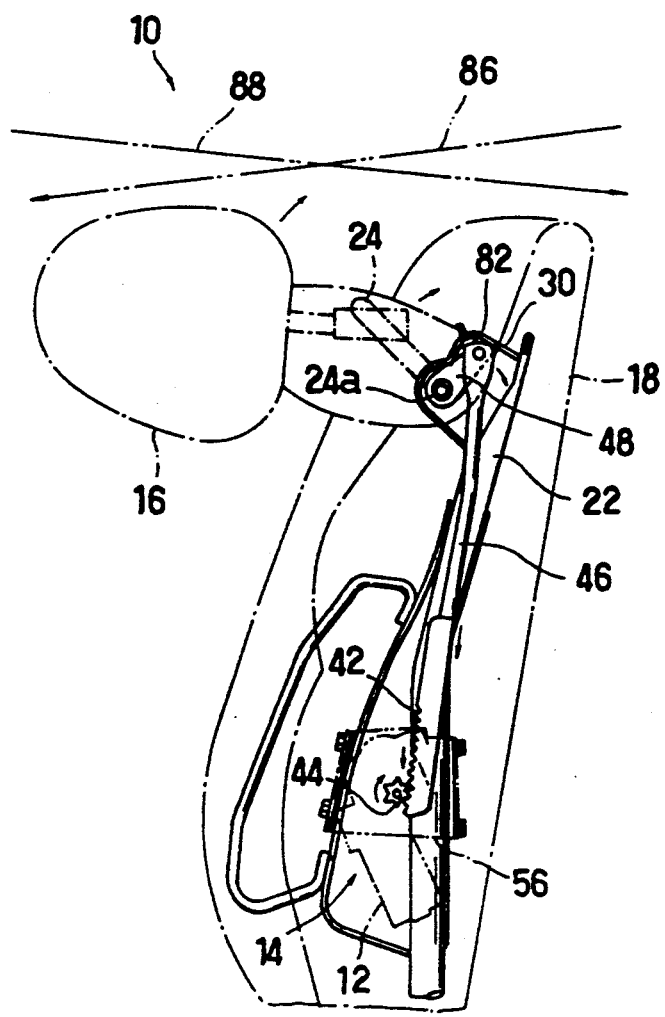
FIG. 4 is a schematic, longitudinally sectional view of the headrest arrangement, with the headrest being located at the non-use position.

Further, as shown in FIGS. 1 and 4, similar to the foregoing holes (76,78) and elastic member (74), there is formed, at the upper surface of first bearing bracket (30), a through-hole (84) into which is fit secured another elastic member (82) made of urethane rubber material or the like. The second elastic member (82) is also for limiting the upward rotation of the link piece (48), as can be seen from FIG. 4. Namely, when the connecting rod (46) is moved at a maximum level through the foregoing drive mechanism (14) for placing the headrest (14) at the non-use position, the link piece (48) is rotated upwardly by the connecting rod (46) into contact with the second elastic member (82) and retained there against further upward rotation.

It is noted here that both first and second elastic members (76)(82) are disposed at a point for simultaneously stopping the stopper member (72) and link piece (48), and that the detent edge (80) of the second bearing member (36) is defined at a point where the upper terminal of rack gear part (42) comes down to the pinion gear (44), as seen in FIG. 2, when the headrest (16) reaches the use position.

Now, a description will be made of operation of the above-constructed headrest arrangement (10).

When the headrest (16) is located at the use position, a counterclockwise rotation of the pinion gear (44) by actuation of a motor (12), as viewed from FIG. 2, causes upward movement of the rack gear part (42) in mesh with the pinion (44) to raise the connecting rod (46), which causes counterclockwise rotation of the link piece (48) about the axis of shaft ends (24a, 24b), thereby simultaneously rotatting the shaft (24). With this rotation of shaft (24), both headrest (12) and stays (20) are rotatively displaced in a direction forwardly of the seat back (18) towards the non-use position as indicated in FIG. 4. At the non-use position, the motor (12) is stopped automatically by a suitable control system (not shown) to cease the action of drive mechanism (14). As shown, the headrest (14) is located below the forward view line (86) of an occupant sitting on a rear seat, as well as the backward view line (88) of a driver on a front seat. In this way, the rear-seat occupant or front-seat driver may attain a good vision field at their respective sitting position.

At this headrest non-use position, referring to FIG. 6 in conjunction with FIG. 4, it is seen that link piece (48) and stopper member (72) are in pressing contact with the second and first elastic members (83)(74), respectively. Those elastic members (83)(74) are in the state of being resiliently deformed to limit the upward movement of link piece (48) and stopper member (72). Accordingly, it is to be appreciated that the rotation of shaft (24) is limited in a bilateral way at (24a)(24b); in other words, the shaft side (24a) is limited by the drive mechanism (14) while the other shaft side (24b) is limited by the stopper member (72), whereby the headrest (16) at the non-use position is not supported only by the drive mechanism (14), but supported bilaterally as above, thus insuring to avoid twisting deformation of headrest as found in the prior art. In addition, it is to be appreciated that a vertical wobbling of headrest (16) due to vertical vibration is absorbed by such resilient contact of the link piece (48) and stopper member (72) with the mating elastic members (74)(82), and that the repercussion of the elastic members serves to give a counter force against the link piece (48) and stopper member (72), thereby limiting the rotation of shaft (24) in cooperation of the drive mechanism (14). This arrangement provides a sufficient limit against undesired extreme rotation of the headrest (16) over the use and non-use position.

On the other hand, as indicated by the arrow in FIG. 4, when the headrest (16) is displaced from the non-use position towards the use position by actuation of the drive mechanism (14), in which case, the pinion gear (44) is rotated clockwise to cause lowering of the connecting rod (46), then the link piece (48) is likewise rotated to cause simultaneous rotation of shaft (24), with the result that the headrest (16) reaches the use position upon the top of seat back (18) as shown in FIG. 2 and the motor (12) is automatically stopped to place the headrest (16) at that position. At this point, referring to FIG. 5, it is seen that the second contact edge (72b) of stopper member (72) is brought to contact with the detent edge (80) of second bearing bracket (36), thereby preventing the headrest (16) against further backward rotation in cooperation with the drive mechanism (14). In this instance, it is to be understood that the shaft (24) is limited its rotation bilaterally, i.e. at the left-side drive mechanism (14) and at the right-side bearing bracket (36) as viewed from FIG. 1, whereby, at the use position as well, the shaft (24) and thus headrest (16) are positively prevented from being twisted and deformed in contrast to the prior art. Accordingly, a stable support is assuredly given to the head of occupant leant onto the headrest (16), and the occupant will feel good without uneasy psychological state.

Preferably, the rotative movement angle of headrest between the use and non-use positions should be set at 85 degrees, for example.

While having thus far described the present invention, it should be noted that the invention is not limited to the illustrated embodiment, but any other modification, replacement and addition may be possible structurally without departing from the spirit and scope of the appended claims. For example, the second elastic member (82) may not be provided in view of the drive mechanism (14) being sufficient to limit the rotation of shaft (24). The elastic members (74)(82) may be made of other elastic material insofar as they have optimal resilient property to limit the headrest rotation and absorb the vertical wobbling of the connecting rod. The present headrest arrangement is not adapted for use in the automotive seat, but may be applied to other seats of train, airplane, and vessels or the like.

What is claimed is:

1. An arrangement of a headrest in a seat, comprising:
a crank-like shaft which extends transversely of a seat back of said seat and is disposed at an upper part of said seat back, such that both ends of said shaft are rotatably secured to a seat back frame provided within said seat back;
a drive mechainsm for causing said shaft to be rotated so as to displace said headrest between a vertical use position and a horizontal non-use position, said drive mechanism being disposed at one lateral side of said seat back frame and being operatively connected with a one end part of said shaft;
a stopper means provided fixedly at another free end part of said shaft which is disposed at another lateral side of said back frame without said drive mechanism being provided thereat;
a bearing bracket fixed on said another lateral side of said seat back frame, on which bearing bracket is rotatably supported said another free end part of said shaft; and
an elastic means provided fixedly in said bearing bracket in such a manner as to resiliently receive one side surface of said stopper means when said headrest is located at said non-use position;
wherein said headrest at said non-use position is supported stably by virtue of said drive mechanism at said one lateral side of said seat back frame and both said stopper and elastic means at said another lateral side of said seat back frame.

2. The arrangement as defined in claim 1, wherein said bearing bracket is provided with a limit means against which another side surface of said stopper means is to be contacted, to thereby limit further backward rotation of said headrest beyond said vertical use position.

3. The arrangement as defined in claim 1, wherein said drive mechanism comprises a link member fixed to said one end part of said shaft, said link member extending therefrom in a direction orthogonal to an axis of said shaft, a connecting rod whose one end is pivotally connected to said link member and whose another end is formed with a rack gear, and a pinion gear in mesh with said rack gear, which pinion gear is to be rotated by a motor, and wherein there is provided a second bearing bracket for rotatably supporting said one end part of said shaft, said second bearing bracket having, provided therein, an elastic means against which said link member is to be contacted.

4. The arrangement as defined in claim 1, wherein said bearing bracket is securely mounted on a support bracket which is fixed on said another lateral side of said seat back frame.

* * * * *